(12) United States Patent
Conklin et al.

(10) Patent No.: US 7,352,780 B1
(45) Date of Patent: Apr. 1, 2008

(54) SIGNALING BYTE RESILIENCY

(75) Inventors: Richard William Conklin, Forsyth County, GA (US); Benjamin Joseph Marsella, Alpharetta, GA (US)

(73) Assignee: Ciena Corporation, Linthicum, MD (US)

( * ) Notice: Subject to any disclaimer, the term of this patent is extended or adjusted under 35 U.S.C. 154(b) by 543 days.

(21) Appl. No.: 11/024,772

(22) Filed: Dec. 30, 2004

(51) Int. Cl.
*H04J 3/06* (2006.01)

(52) U.S. Cl. ............... 370/514; 370/522; 370/442; 370/242; 370/907; 714/821; 714/755; 714/762

(58) Field of Classification Search ............... 370/522, 370/442; 714/821, 755, 762
See application file for complete search history.

(56) References Cited

U.S. PATENT DOCUMENTS

| | | | |
|---|---|---|---|
| 4,375,101 A * | 2/1983 | Cerracchio | 386/124 |
| 4,998,242 A * | 3/1991 | Upp | 370/392 |
| 6,058,119 A * | 5/2000 | Engbersen et al. | 370/466 |
| 6,275,499 B1 * | 8/2001 | Wynn et al. | 370/438 |
| 6,967,948 B2 * | 11/2005 | Iacovino et al. | 370/384 |
| 2002/0172227 A1 * | 11/2002 | Varelas et al. | 370/514 |
| 2003/0161355 A1 * | 8/2003 | Falcomato et al. | 370/539 |
| 2004/0059974 A1 * | 3/2004 | Nicolaidis | 714/724 |
| 2004/0170128 A1 * | 9/2004 | Takamichi | 370/245 |

* cited by examiner

*Primary Examiner*—Edan Orgad
*Assistant Examiner*—Andrew C. Lee
(74) *Attorney, Agent, or Firm*—Clements Bernard Miller; Christopher L. Bernard; Tyler S. Brown

(57) ABSTRACT

A method and system for providing signaling byte resiliency across a telecommunications network. Embodiments of the invention create copies of original signaling bytes and transports the copies in addition to the original signaling bytes. Testing is performed at each node in the network to determine the validity of the original signaling bytes, i.e. if the signaling bytes have been corrupted. If original signaling bytes are found invalid, then the copies of the signaling bytes are used as a valid replacement for the corrupted signaling bytes.

21 Claims, 8 Drawing Sheets

SIGNALING BYTE RESILIENCY

BACKGROUND OF THE INVENTION

1. Field of the Invention

The present invention relates to providing signaling byte resiliency in telecommunication networks.

2. Description of Related Art

In conventional telecommunications network, many protection applications use signaling bytes to indicate the state of the protection application and to also request various protection actions. These signaling bytes conventionally traverse the network in the signaling overhead of an optical transport frame such as a synchronous optical network (SONET) frame. As these bytes traverse the network, they can be corrupted by conditions on the physical medium or by the intermediate telecommunications equipment. Standard signaling byte mechanisms may accept these corrupted bytes, causing the protection application to act on signaling bytes that are invalid.

Many conventional protection applications use signaling bytes to indicate the state of the protection application and request various protection action. In SONET and synchronous digital hierarchy (SDH) networks, signaling bytes are usually provided within a frame. The standard frame contains a variety of information and provides the information at unique locations within the frame. The frame includes an overhead section and a payload section. The payload contains the information to be transmitted while the overhead contains information such as framing, error monitoring, management and payload pointer information. The overhead is sectioned into three areas, path overhead, line overhead and section overhead. Contained within the line overhead are byte locations that may be used to store signaling information. For example specific byte locations known as K1 and K2 bytes may be used. The K1 and K2 bytes are often referred to as the K-bytes and signal or trigger protection mechanisms.

In optical networks, such as SDH and SONET, when a frame of data is received at, for example, a node, the data contained within the various byte locations within the overhead are used by the various components in the node in order to process the data properly. According to the SONET networks standards described in the Bellcore GR-253-CORE, hereby incorporated by reference, a standard filter is used within each node to determine the accuracy of the received data contained within certain byte locations. For K-bytes if the standard filter determines the k-bytes are consistent for three frames and contain a valid bit pattern, then they are accepted. A similar type of filter may be used in SDH applications.

However, conditions on a fiber optic cable connecting two nodes, or the intermediate transmission equipment between the two nodes may corrupt the K1 and K2 bytes such that the K-Bytes are consistently incorrect for three frames but also contain a valid bit pattern. For example, they can be corrupted by conditions on the physical medium or by the intermediate telecommunications equipment. Examples include, but are not limited to, intermediate WDM (wave division multiplexing) transport equipment, intermediate Mux/Demux equipment, and facility signal level at or near the LOS (loss of signal) threshold. Standard signaling byte mechanisms may accept these corrupted bytes, causing the protection application to act on signaling bytes that are invalid. Thus, these corrupted signaling bytes are accepted by the network as valid bytes, which may cause significant errors in the system.

SUMMARY OF THE INVENTION

Embodiments of the present invention operate within a telecommunications network. Within the network operations are performed that determine whether signals transmitted over the network include errors. These operations include a resiliency process that ensures signals containing errors are not retransmitted to other nodes and operations within the network.

BRIEF DESCRIPTION OF THE DRAWINGS

Various exemplary embodiments of the invention will be described in detail with reference to the following figures, wherein.

DETAILED DESCRIPTION OF PREFERRED EMBODIMENTS

Embodiments of the present invention provide a system and method for providing assurances of accurate signaling byte information during transmission of the signaling bytes over a network. This is accomplished to achieve signaling byte resiliency.

Embodiments of the present invention may be implemented within various types of networks, including SONET, SDH and ATM (Asynchronous Transfer Mode). Preferred networks for implementing the embodiments of the present invention are SONET and SDH. The SDH network is the standard for optical networks most used in the international community, such as Europe, while SONET standards are used mostly in the United States. SDH and SONET are very similar and by many are referred to as equivalents, although there are some differences between the two. However, for exemplary purposes discussion of the embodiments of the present invention are described in relation to a SONET network.

Figure 1:
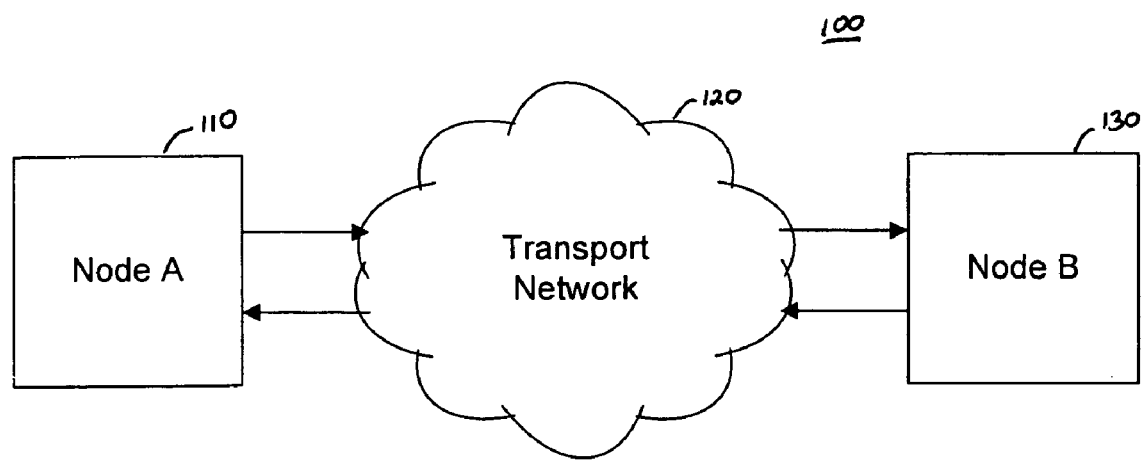
FIG. 1 illustrates a conventional switching network.

FIG. 1 illustrates a network configuration 100. The network 100 includes at least two nodes, Node A 110 and Node B 130. The two nodes are connected to each other through the transport network 120. The transport network carries the signals between Node A 110 and Node B 130. The transport network 120 allows communication to and from both Node A 110 and Node B 130.

In network 100, a signaling byte can be sent from either Node A 110 or Node B 130, through the transport network 120. However, for discussion purposes, only the transmission of a signaling byte from Node A 110 to Node B 130 is discussed. In the conventional SONET network 100, signaling bytes are transmitted from Node A 110 to Node B through the transport network 120. In a SONET network, Node A 110 may use the K1 and K2 byte locations of a data frame for the signaling bytes. Other locations may be used as long as they are consistent throughout the network so as to be identifiable. Therefore, other networks, such as SDH, may implement the concepts defined herein using appropriate locations for storing signaling bytes for that particular network.

Further, although embodiments of the invention discuss the signaling bytes as K-bytes, the principles disclosed in this invention can be applied to any signaling mechanism regardless of the size (e.g., byte, bit, nibble, etc.) or other format used to contain the information.

Once the signaling bytes are placed within the data frame, the data frame is transmitted through the transport network 120. During this transmission, the signaling bytes may be corrupted by one or more of the devices used to transport the signaling bytes through the transport network 120 to Node B 130. However, corruption may occur anywhere within the network, such as within the transmission fiber itself due to various factors such as chromatic dispersion polarization mode dispersion, four wave mixing, attenuation, etc.

In the conventional SONET network the signaling bytes are only to be used if they are consistent for three consecutive data frames. If the same corruption occurs across signaling bytes in at least three consecutive data frames, when the data frames are received at Node B 130, they will be accepted as valid signaling bytes. Since the signaling bytes will be viewed a valid, they will be sent to other applications including the protection application and processed.

In optical networks, such as SONET, a protection line may be provided in addition to a working line or active line on the various ring structures, including unidirectional path-switched ring (UPSR) and bi-directional line switched rings using two or four optical fiber configurations (BLSR-2, BLSR-4). These types of ring networks are discussed in more detail later. The protection line provides an alternate path for the communication signal to travel should a fault, such as a fiber break or errors occurring in a particular device, occur in the active line. The protection application identifies the fault and switches the data to the protection path. The identification of any fault is aided by the signaling bytes. If invalid signaling bytes are identified as valid signaling bytes, the protection switch will process the invalid signaling bytes in a normal manner. Thus, the traffic sent across the network will likely be adversely affected.

Again referring to FIG. 1, in an embodiment of the invention signaling byte resiliency can be implemented within node A 110 and node B 130 of the SONET network 100. This implementation allows for the detection and correction of corrupted signaling bytes that are created within the network 100. Further, it provides a mechanism that prevents corrupted bytes from being accepted as valid bytes when received at a transmitter.

In this embodiment, when Node A 110 writes the signaling bytes to the K1 and K2 bytes of a data frame a copy of the signaling byte(s) is also created. The copy is subjected to a logical operation, such as being exclusively or'ed with the value 0xFF, to create redundant bytes and stored separately in the data frame. Any logical operation may be used including, but not limited to, cyclic redundancy check, parity, and redundant copy. Preferably the copies may be written to unused K-byte locations in overhead section of the data frame. However, the copy location may be any unused or growth byte location in the frame, specifically unused overhead bytes. Corresponding application Ser. No. 09/552, 109 assigned to Ciena Corp., discusses the frame data and locations, the contents of which are hereby incorporated by reference.

Further, although embodiments of the present invention disclose signaling bytes as traversing a network in the signaling overhead of a data frame, the principles disclosed in this invention can be applied to any signaling mechanism including but not limited to other overhead, out of band signaling, service channel or overlay IP network.

When the signaling bytes are sent through the network, corruption of the signaling bytes may occur. When the signaling bytes are received at Node B 130, a signal byte resiliency test is performed on the signaling bytes prior to indicating the signaling bytes as valid. In embodiments of the invention, the signaling bytes may also be required to be consistent for three frames prior to performing the signal byte resiliency test. Thus, maintaining the standard set out in the Gr-253 CORE for SONET networks. However, in other embodiments the consistency requirements may be changed from being consistent for three consecutive frames to any number of frames or the consistency may not be determined at all.

Figure 2:
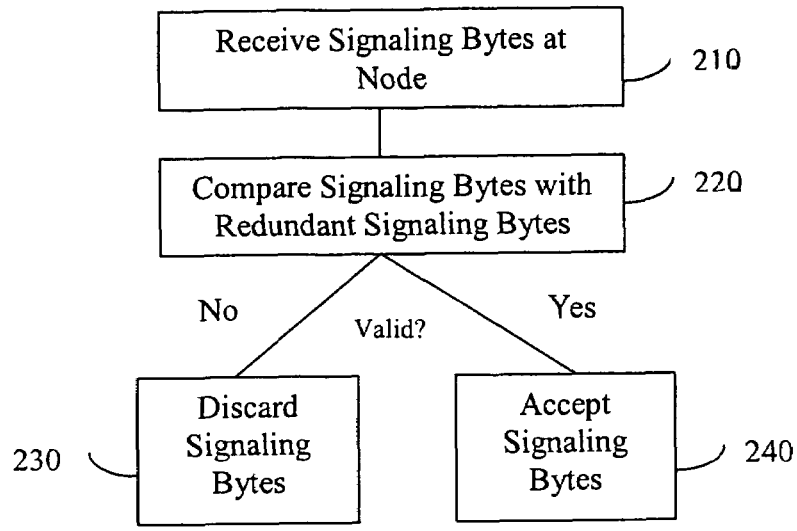
FIG. 2 is a flow diagram depicting an operation performed within a node according to embodiments of the presenting invention.

The signaling byte resiliency test compares the original signaling bytes with the redundant bytes. This is illustrated in FIG. 2. The signaling bytes are received at a node 210. A comparison 220 is made between the signaling bytes and redundant signaling bytes. If the original signaling bytes and redundant bytes are determined to match, then the original signaling bytes are given a valid status and accepted 240. If the original signaling bytes and redundant bytes do not match, then it is determined that the original signaling bytes are corrupted and they are discarded 230.

Figure 3:
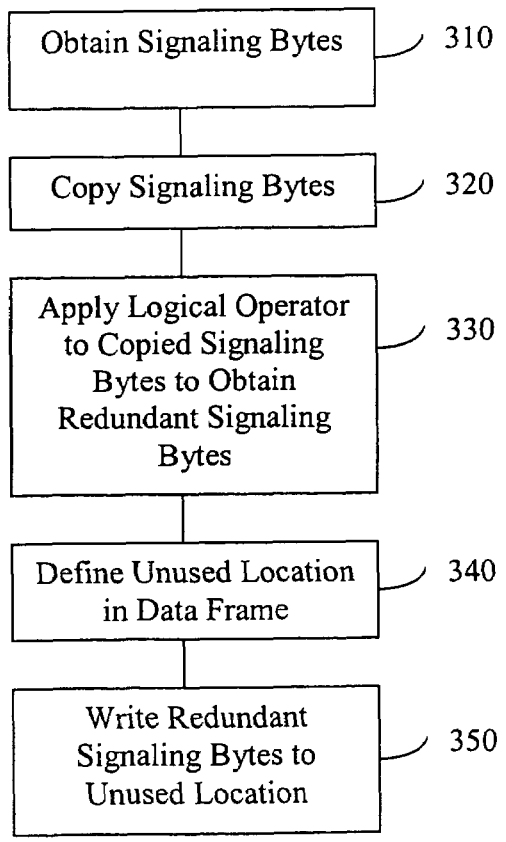
FIG. 3 is a flow diagram depicting an operation performed within a node according to embodiments of the presenting invention.

Also, within the node the protection application may create signaling bytes that are then written to data frames for transmission through the network. FIG. 3 illustrates this process. The signaling bytes are obtained 310 within the node from the protection application or other elements within the node. The signaling bytes are copied 320. The copied signaling bytes are applied through a logical operation 330, (discussed later) to obtain redundant signaling bytes. Unused byte locations within a data frame are determined 340 and the redundant signaling bytes are written to the unused bytes locations 350. Thus, the signaling bytes and redundant signaling bytes are written to the same data frame and can be used by other nodes to determine the validity of the signaling bytes transmitted in the data frame.

Figure 4:
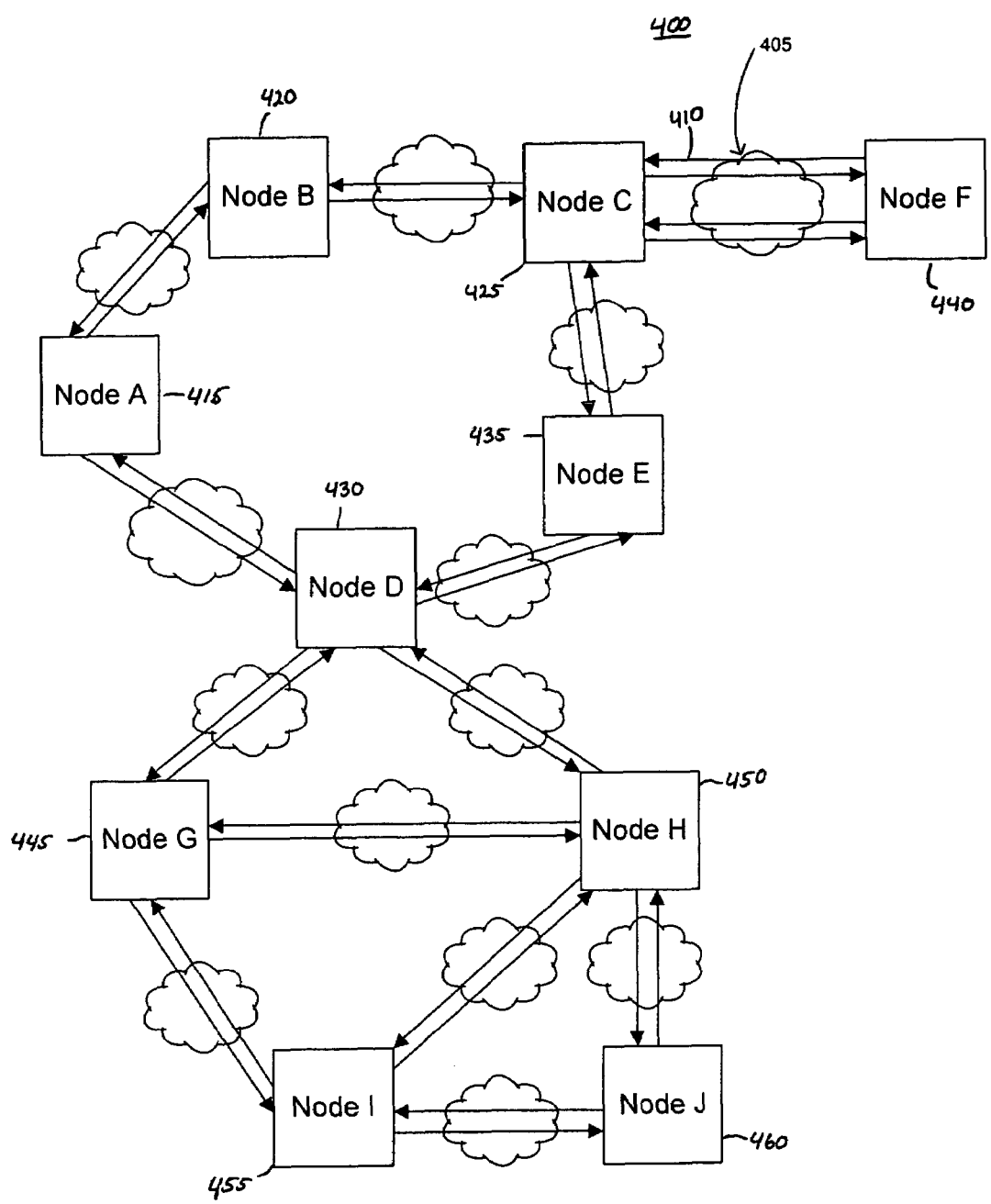
FIG. 4 illustrates the various types of networks.

FIG. 4. illustrates the various types of network configurations that may be implemented. Node A 415, Node B 420, Node C 425, Node D 430 and Node E 435 form a ring configuration. The Nodes are connected to each other through network 405. The lines 410 illustrate the communication lines e.g., one or more fiber lines, between each node and the direction of communication. The ring network may be implemented with, for example, a unidirectional path-switched ring (UPSR) or a two or four fiber bi-directional line switched rings (BLSR-2, BLSR-4).

A UPSR provides duplicated paths for each service. Adjacent nodes on the ring are interconnected by a pair of optical fibers. The protection traffic travels in one direction around the ring on one of the optical fibers. The working traffic travels in the opposite direction on the second fiber to provide a backup protection in case of failure.

The BLSR operates similar to the UPSR, with one major distinction. The BLSR can be a two-fiber BLSR or four-fiber BLSR. The two-fiber BLSR utilizes two optical fibers that provide working traffic around the ring of nodes, the working traffic on the optical fibers traveling in opposite directions to each other. The main difference of a BLSR from a UPSR is that the BLSR allows bandwidth to be reused when traffic is terminated at various nodes on the ring.

The four-fiber BLSR operates similar to the two-fiber except that it provides two more optical fibers that interconnect the nodes. This provides the capacity to handle greater amounts of traffic, while also providing greater protection in case of failure by one or more of the optical fiber paths.

Node C 425 and Node F 440 illustrates a linear point to point configuration which is another example of a network within the scope of the invention. In the linear network each node is serially connected with a node at the beginning and end of the network configuration.

The combination of Node D 430, Node G 445, Node H 450, Node I 455 and Node J 460 form a mesh ring network, which is another example of a network within the scope of the invention. Each of the nodes are connected in a ring configuration, while some of the nodes are also directly connected to nodes not directly adjacent to it in the ring. For example, Node G 445 is connected to both Node D 430 and Node I 455 which are adjacent nodes in the ring. Node G 445 is also directly connected to Node H 450. This type of network provides diverse routing and rerouting possibilities for traffic within the network configuration.

As is illustrated in FIG. 2 Node C 425 is also part of the ring network of Node B 420, Node A 415, Node D 430 and Node E 435. Also, Node D 430 is connected as part of the ring network above and the mesh ring network which includes Node G 445, Node H 450, Node I 455 and Node J 460. The configuration of networks in FIG. 4 demonstrate the interconnectivity of various types of networks. The embodiments of the present invention are not limited to a certain network configuration, but may be implemented in any conceivable arrangement.

Figure 5:
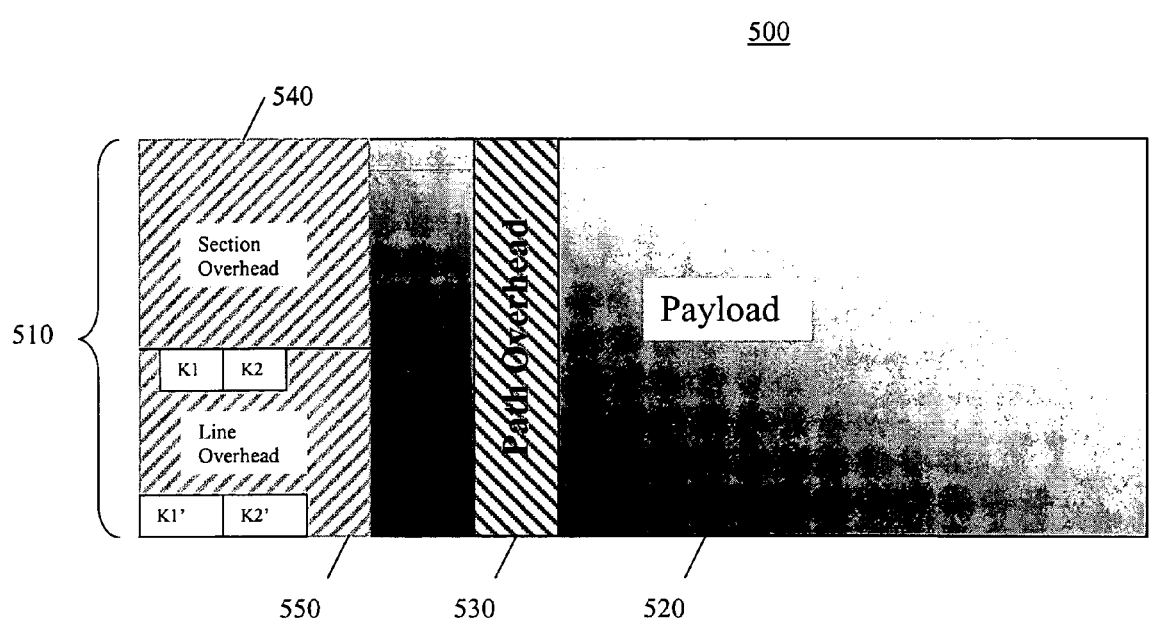
FIG. 5 illustrates an STS Frame.

FIG. 5 illustrates an exemplary data frame 500 that may be used in conjunction with the present invention. In an optical network, such as SONET, the data is usually transported through the network within a data frame 500. The data frame 500 is separated into two sections. The first section is the transport overhead 510 and the second section is the payload section 520. The payload section 520 contains the desired transported data, for example, image data or various files. A section of the payload is designated for path overhead data 530. The path overhead 530 contains the data necessary for identifying data in the payload and monitoring errors.

The overhead 510 is divided into two areas, the section overhead 540 and the line overhead 550. Both of these sections contain conventional framing, error monitoring, payload pointer information and management information for the frame and it's data.

In embodiments of the invention the frame 500 may be a STS-1 frame. The basic STS-1 frame is configured similar to the features in FIG. 5. in the STS-1 frame, the transport overhead 510 consists of three columns and nine rows, while the payload section 520 consists of eighty seven (87) columns, one column for the path overhead 530 and eighty six columns for the payload. The section overhead 540 consists of three columns and three rows (3×3), while the line overhead consists of three columns and six rows (3×6).

Figure 6:
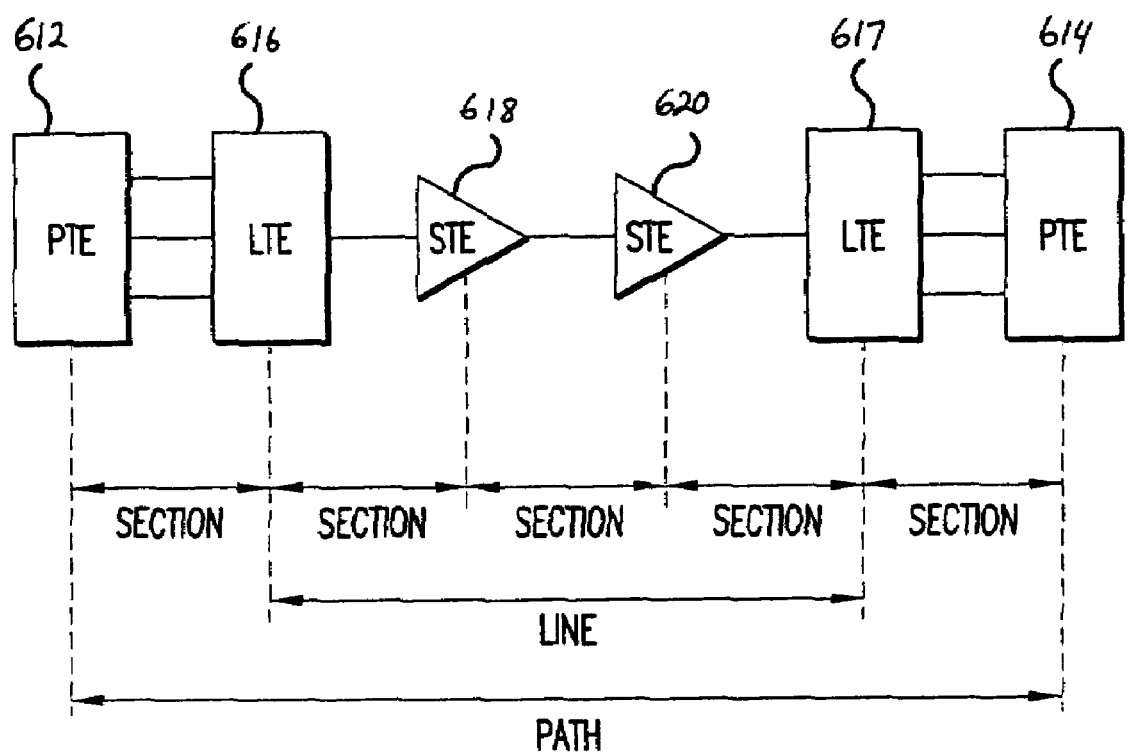
FIG. 6 illustrates an exemplary path in an optical network.

The terms "section", "line" and "path" are well known to those skilled in the art. FIG. 6 illustrates an exemplary path in an optical network that illustrates the uses of the various sections of the STS-1 frame as it traverses the network. A path is shown extending between two path terminating equipment (PTE) 612, 614, terminals that communicate on the network. A line in the path extends between two consecutive line-terminating equipment (LTE) 616, 617, for example, add-drop multiplexers. A section is a portion of a line between two section terminating equipment (STE) 618, 620, such as amplifiers located between a STE and LTE, or between a LTE and PTE. The section overhead 540 includes framing bytes that deal with the transport of multiplexed signals across a particular section of the network. The line overhead 550 contains bytes that include payload pointers, management of the frame and data and error monitoring.

Included in the line overhead 550 are K1 and K2 bytes that, as discussed above, are a preferred location for placing the signaling byte information for automatic protection switching, although other locations may be used. When a node receives the data frame 500 in the present invention, the node will retrieve the signaling byte information from the K1 and K2 bytes located in the line overhead 550. Also within the line overhead 550 are unused, so called "growth", byte locations. These unused byte locations may be used for the copies of the original signaling byte information. For ease of understanding, the copy locations will be referred to as K1' and K2' locations.

Figure 7:
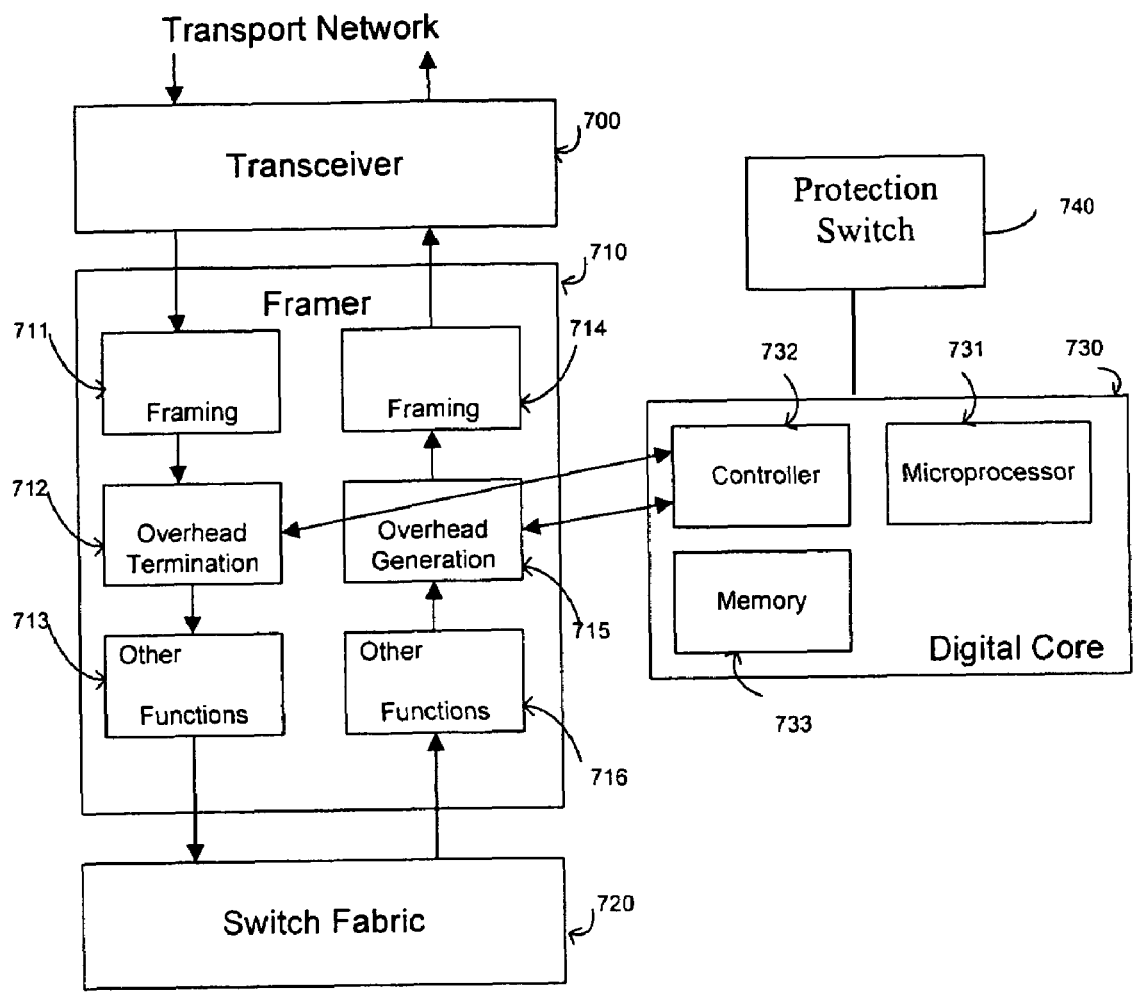
FIG. 7 illustrates the various circuitry used within each Node of a SONET network according to the present invention.

FIG. 7 provides an illustration of exemplary devices contained within each node in the network. Included is a transceiver 700, framer 710, switch fabric 720, digital core 730 and protection switch mechanism 740. The transceiver 700 is a conventional device in and of itself that receives the signals that are sent through the network via the transport network. The transceiver 700 also functions to transmit signals from the node to the network. After receiving the signals, which may be in the form of a data frame, from the network, the transceiver 700 forwards the data frame to the framer 710.

The framer 710 acts to obtain the necessary data from the data frame and forward the data to the various operations. The framer 710 also adds data to the data frame, if necessary, prior to transmission of the data frame from the node. Once the data frame is received by the framer 710 it is processed by the framing operations 711 to determine if the data frame is a SONET, SDH or other type of data frame. Once this determination is made, the data frame is sent to the overhead termination section 712 for processing of the information contained in the overhead section of the data frame.

Figure 8:
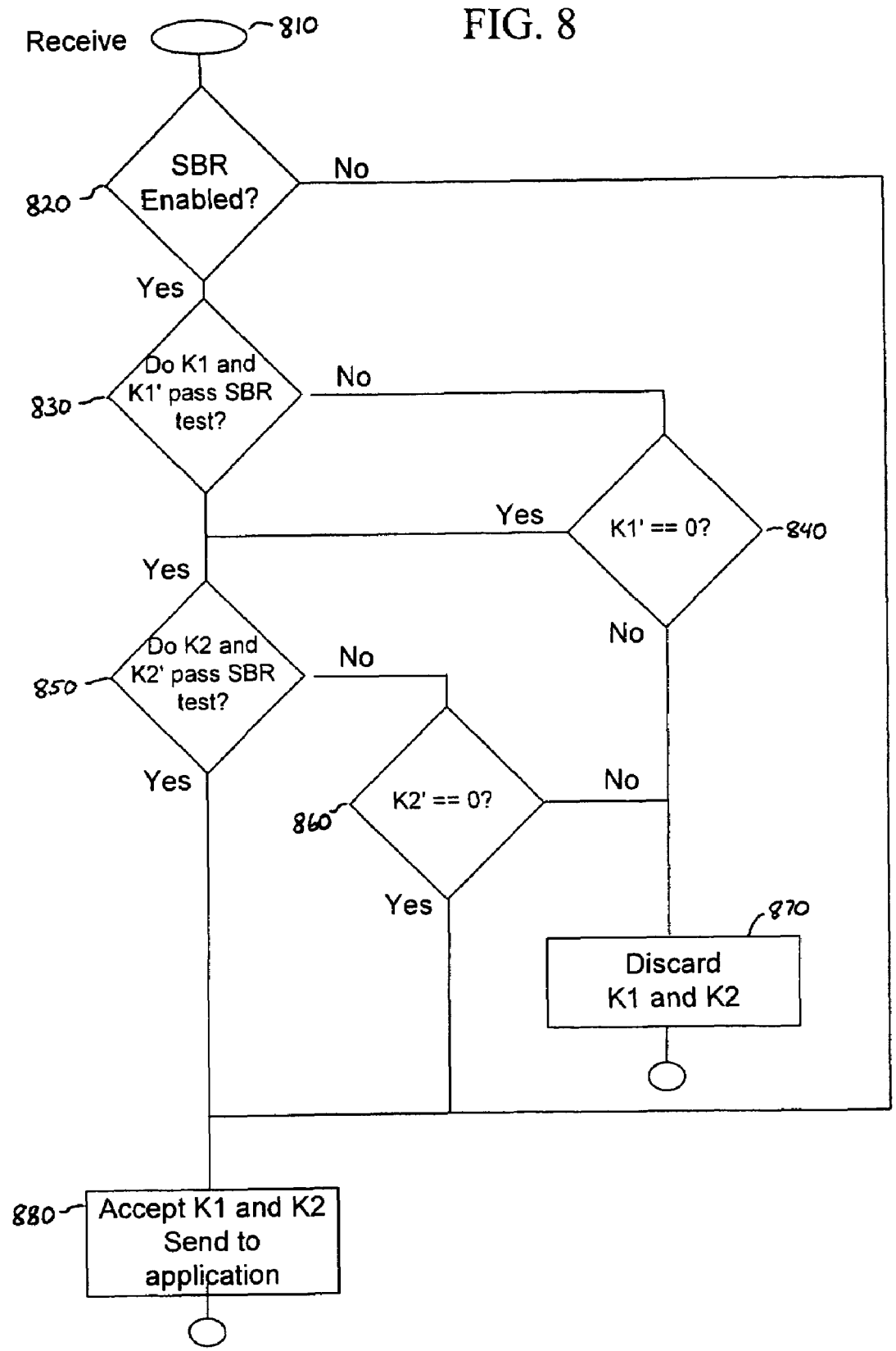
FIG. 8 is a flow diagram depicting an operation performed within a node according to embodiments of the presenting invention.

The overhead termination 712 is controlled by the digital core 730. The digital core 730 includes a microprocessor 731, memory 733 and controller 732 which operate together to control the receiving and transporting of data from data frames. It is noted that the controller 732 for controlling the overhead termination 712 and overhead generation 716, may be implemented as software or hardware within the digital core 733. Regarding the signaling bytes within the data frame, the controller 732 implements a process to determine the validity of the signaling bytes. The flow diagram in FIG. 8 demonstrates the process used by the controller 732 at the overhead termination section 712.

When a data frame is received the overhead termination 712, the controller 732 in the digital core 730, determines 820 first if the signal byte resiliency mechanism has been turned on. The turning on or off the signal byte resiliency function and operation at each node can be performed by a user through an interface management feature of the network. Thus if the signal byte resiliency is disabled at a particular node, the framer will accept 880 the signaling bytes within the K1 and K2 byte locations as being valid. When signaling byte resiliency is disabled on a node or other elements within the system do not support the signaling byte resiliency the K1' and K2' bytes are programmed so that they contain an all zeros pattern or other similar related pattern to signify that the K1' and K2' byte locations do not contain the redundant.

If signaling byte resiliency is enabled, the process follows to testing 830 the K1 byte and the K1' bytes through the signaling byte resiliency test. The signaling byte resiliency test 830, as discussed earlier, compares the K1 byte and K1' byte to determine if a corruption has occurred in the K1 byte. If corruption is detected in the K1 signaling byte then the test has not been passed. If the test has failed, then it is determined if the K1' byte contains an all zeros pattern or similar pattern. If the K1' byte does not contain an all zeros pattern, then the corrupted K1 and K2 bytes are discarded 870.

If the K1' byte does contain an all zeros pattern or similar pattern, then the process runs a signaling byte resiliency test on the K2 byte 850. The signaling byte resiliency test on the K2 byte 850 is also performed if the K1 byte passes the signaling byte resiliency test 830. As done with the K1 byte, the K2 byte is compared with the K2' byte to determine if corruption has occurred in the K2 byte. If the K2 byte passes the test, meaning the K2 byte is not corrupted, both the K1 and K2 bytes are accepted as valid signaling bytes 680. If the K2 byte does not pass the signaling byte resiliency test, meaning the K2 byte is corrupted, it is determined if the K2' byte contains an all zeros pattern or similar pattern. If the K2' byte does not contain an all zeros pattern, then both the K1 and K2 bytes are discarded 870. If the K2' byte does contain an all zeros pattern or similar pattern, then the K1 and K2 bytes are accepted 880.

Once a determination has been made on whether the K1 and K2 are discarded or accepted, this information is sent to the protection switch 740 and possibly a network manager by which other nodes in the system may be informed of the error if the signaling bytes are discarded or informed of the validity of the signaling bytes.

The switch fabric acts to control the traffic of data throughout the node and the data contained in the data frame. The switch fabric 720 also provides data to the framer 710. In lieu of the switch fabric 720, an optical add/drop multiplexer (OADM) may be used. The data from the switch fabric 720 is received at the framer 710. The other functions 716 within the framer 710 may also provide additional data to the data received from the switch fabric 720. The data is then provided to the overhead generation operation 715. At the overhead generation 515 the K1 and K2 signaling bytes and K1' and K2' signaling bytes are written to the overhead section of an outbound data frame. First, the K1' and K2' signaling bytes are generated by subjecting a copy of the signaling bytes in the K1 and K2 bytes locations to a logical operation, such as being exclusively OR'ed with a value such as 0xFF, to create redundant data, as discussed earlier. However, logical operations and values other than an exclusive OR and 0xFF may be used to obtain redundant data. This includes, but is not limited to, parity, cyclic redundancy check and redundant copy.

Figure 9:
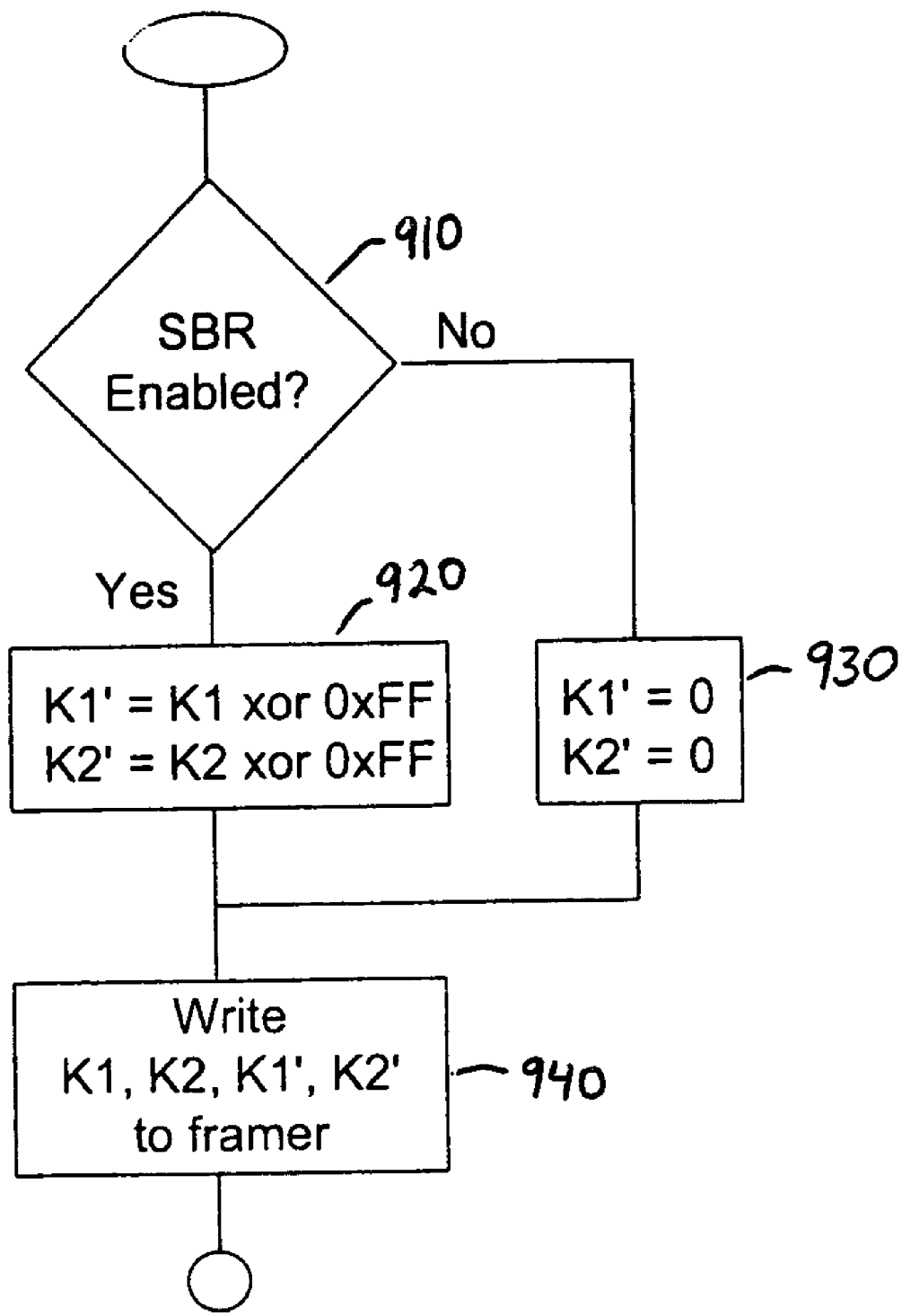
FIG. 9 is a flow diagram depicting an operation performed within a node according to embodiments of the presenting invention.

Once the redundant data is created, the redundant data is written to the K1' and K2' byte locations. The overhead generation 715 is controlled by the controller 732 in the digital core 730. The controller 732 obtains the current signaling byte data that has been received at the node from the memory where it is stored. For example, this memory may be the memory matrix 717, as discussed above. The controller 732 controls the writing of the signaling byte data to the K1 and K2 byte locations in the line overhead section of a data frame. The process of writing the signaling bytes to the frame is illustrated in FIG. 9.

The controller 732 first determines if the signaling byte resiliency mechanism is enabled or disabled 910. If the signaling byte resiliency is disabled then the K1' and K2' bytes are defined and written as zero. If the signaling byte resiliency is enabled, the K1' and K2' bytes are defined by the K1 and K2 bytes processed through a logical operation 920. The K1' and K2' byte locations are then defined in the data frame 940. Once the K1' and K2' byte locations have been defined, the signaling bytes are written to the K1 and K2 byte locations and the redundant data is written to the K1' and K2' locations in the data frame 940.

Once the signaling bytes are written to the data frame 940 at the overhead generation 715, the data frame 940 is passed to the framing section 714 of the framer 710. The framing section 714 puts the data frame in the correct format for transfer over a specified network, such as SONET or SDH. The data frame is then provided to the transceiver 700 for transport over the network. Thus, the transported data frame contains the signaling byte resiliency that can be processed by other nodes on the network.

While this invention has been described in conjunction with the exemplary embodiments outlined above, it is evident that many alternatives, modifications, and variations will be apparent to those skilled in the art. Accordingly, the exemplary embodiments of the invention may be made without departing from the spirit and scope of the invention.

What is claimed is:

1. A method for ensuring the resiliency of signaling word(s) transmitted between nodes of a telecommunications network, comprising:
   determining whether signaling word(s) received is valid based on a comparison of the signaling word(s) with redundant signaling word(s), wherein the redundant signaling word(s) is created by applying a copy of the signaling word(s) through a logical operation, and wherein the redundant signaling word(s) is stored in an unused word location(s) in the data frame;
   discarding the signaling word(s) if the signaling word(s) is determined to be invalid based on the comparison of the signaling word(s) with the redundant signaling word(s); and
   accepting the signaling word(s) if the signaling word(s) is determined to be valid based on the comparison of the signaling word(s) with the redundant signaling word(s).

2. The method of claim 1, wherein the logical operation includes applying the copy of the signaling word(s) through an XOR operation.

3. The method of claim 1, further comprising checking the consistency of the signaling word(s) against a predetermined number of consecutive received signaling word(s), prior to performing the comparison of the signaling word(s) with the redundant signaling word(s).

4. The method of claim 3, wherein the predetermined number is three.

5. The method of claim 1, further comprising determining, at each node in the network, whether the node is enabled or capable so as to be able to perform a comparison of the signaling word(s) with the redundant signaling word(s).

6. The method of claim 5, further comprising accepting the signaling word(s) as valid at a node, if the node is not enabled or capable so as to be able to perform a comparison of the signaling word(s) with the redundant signaling word(s).

7. The method of claim 1, wherein signaling word(s) is transmitted via a data frame in a SONET or SDH network.

8. The method of claim 1, wherein unused byte locations are located in an overhead section of the data frame.

9. The method of claim 1, wherein the redundant signaling word(s) is written to the overhead section of the data frame.

10. The method of claim 1, wherein the redundant signaling word(s) is written to line overhead or section overhead of an overhead section.

11. A method within a node of a telecommunications network for processing signaling word(s), comprising:
   obtaining signaling word(s) created within the node;
   copying the obtained signaling word(s);
   applying a logical operation to the copied signaling word(s) to obtain redundant signaling word(s); and
   defining an unused word(s) location within a data frame to which the redundant signaling word(s) is written prior to transmission of the data frame from the node.

12. The method of claim 11, wherein the logical operation includes applying the copied signaling word(s) through an XOR operation.

13. The method of claim 11, wherein the node is located in a SONET or SDH network.

14. The method of claim 11 wherein unused byte locations are located in an overhead section of the data frame.

15. The method of claim 11, wherein the signaling word(s) and redundant signaling word(s) are both written to the data frame.

16. A method ensuring accurate signaling information processed and transmitted by a node within a telecommunications network, comprising:
   receiving, over the network, a data frame containing signaling word(s);
   determining whether the received signaling word(s) is valid based on a comparison of the signaling word(s) with redundant signaling word(s) stored in the data frame;
   discarding the signaling word(s) if the signaling word(s) is determined to be invalid based on the comparison of the signaling word(s) with the redundant signaling word(s);
   accepting the signaling word(s) if the signaling word(s) is determined to be valid based on the comparison of the signaling word(s) with the redundant signaling word(s);
   obtaining signaling word(s) created within the node based on received signaling words and data within the node;
   copying the obtained signaling word(s);
   applying a logical operation to the copied signaling word(s) to obtain the redundant signaling word(s); and
   defining an unused word(s) location within the data frame to which the redundant signaling word(s) is written prior to transmitting the data frame from the node.

17. The method of claim 16, wherein the logical operation includes applying the copied signaling word(s) through an XOR operation.

18. The method of claim 16, wherein the node is located in a SONET or SDH network.

19. The method of claim 16, wherein unused word(s) location is located in an overhead section of the data frame.

20. The method of claim 16, further comprising checking the consistency of the received signaling word(s) against a predetermined number of consecutive received signaling word(s), prior to performing the comparison of the signaling word(s) with the redundant signaling word(s).

21. The method of claim 20, wherein the predetermined number is three.

* * * * *